United States Patent
Castro et al.

(10) Patent No.: US 10,011,238 B2
(45) Date of Patent: Jul. 3, 2018

(54) SPACE FILLER WITH A VACUUM COVER

(71) Applicant: Ford Global Technologies, LLC, Dearborn, MI (US)

(72) Inventors: Sergio Castro, Cuernavaca (MX); Emmanuel Garcia Ruiz, Santa Ursula Xitla (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/817,890

(22) Filed: Nov. 20, 2017

(65) Prior Publication Data

US 2018/0072245 A1    Mar. 15, 2018

Related U.S. Application Data

(62) Division of application No. 15/232,349, filed on Aug. 9, 2016, now Pat. No. 9,849,845.

(51) Int. Cl.
| | | |
|---|---|---|
| *B60R 13/08* | (2006.01) | |
| *G10K 11/168* | (2006.01) | |
| *B32B 37/10* | (2006.01) | |
| *B32B 27/32* | (2006.01) | |
| *B32B 27/40* | (2006.01) | |

(52) U.S. Cl.
CPC ......... *B60R 13/0815* (2013.01); *B32B 27/32* (2013.01); *B32B 27/40* (2013.01); *B32B 37/1018* (2013.01); *G10K 11/168* (2013.01); *B32B 2307/10* (2013.01); *B32B 2605/00* (2013.01)

(58) Field of Classification Search
CPC ........... B60R 13/0815; B60R 13/0823; B60R 13/083; B60R 13/08; B32B 27/32; B32B 27/40
USPC .......................................... 181/290; 296/39.3
See application file for complete search history.

(56) References Cited

U.S. PATENT DOCUMENTS

| | | |
|---|---|---|
| 4,752,098 A | 6/1988 | Shock |
| 5,164,254 A | 11/1992 | Todd et al. |
| 5,171,619 A | 12/1992 | Reuben |
| 5,712,038 A | 1/1998 | Yamazaki et al. |
| 5,830,548 A | 11/1998 | Andersen et al. |
| 5,900,320 A | 5/1999 | Ogawa et al. |
| 5,976,295 A | 11/1999 | Ang |
| 6,403,195 B1 | 6/2002 | Montagna et al. |
| 6,595,321 B1 | 7/2003 | Tompson |
| 7,677,358 B2 | 3/2010 | Tocchi |
| 7,950,723 B2 | 5/2011 | Vilcek et al. |
| 8,016,340 B2 | 9/2011 | Takakura et al. |
| 9,127,739 B2 | 9/2015 | Locke et al. |
| 2002/0168496 A1 | 11/2002 | Morimoto et al. |
| 2004/0075290 A1 | 4/2004 | Campbell |

(Continued)

*Primary Examiner* — Jeremy Luks
(74) *Attorney, Agent, or Firm* — Vichit Chea; Price Heneveld LLP

(57) ABSTRACT

A vehicle having a space filling panel including a polystyrene layer, a polyurethane layer, and a polyethylene cover where the polyethylene cover forms a vacuum sealed space. The polystyrene layer and the polyurethane layer are both positioned in the polyethylene cover's vacuum sealed space. In another embodiment, a space filling panel for a vehicle includes a polystyrene layer comprising a plurality of polyurethane chips. The polystyrene layer having the plurality of polyurethane chips is enclosed in a vacuum sealed space formed by a polyethylene cover.

15 Claims, 7 Drawing Sheets

(56) References Cited

U.S. PATENT DOCUMENTS

| | | |
|---|---|---|
| 2005/0126848 A1 | 6/2005 | Siavoshai et al. |
| 2006/0135015 A1* | 6/2006 | Seo .......................... B32B 5/08 |
| | | 442/327 |
| 2007/0085364 A1 | 4/2007 | Sato |
| 2009/0026787 A1 | 1/2009 | Muller et al. |
| 2011/0250384 A1 | 10/2011 | Sumi et al. |
| 2015/0118426 A1 | 4/2015 | Roberts |
| 2015/0260331 A1 | 9/2015 | Shinohara et al. |

\* cited by examiner

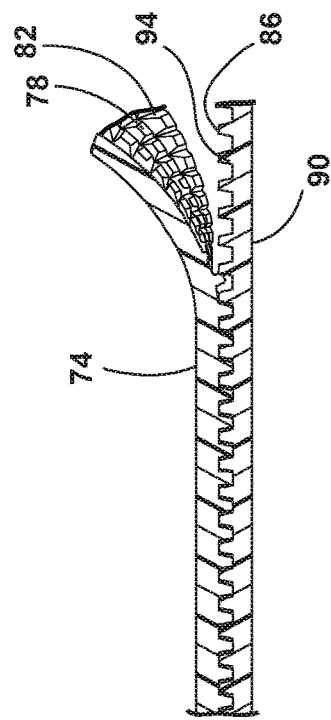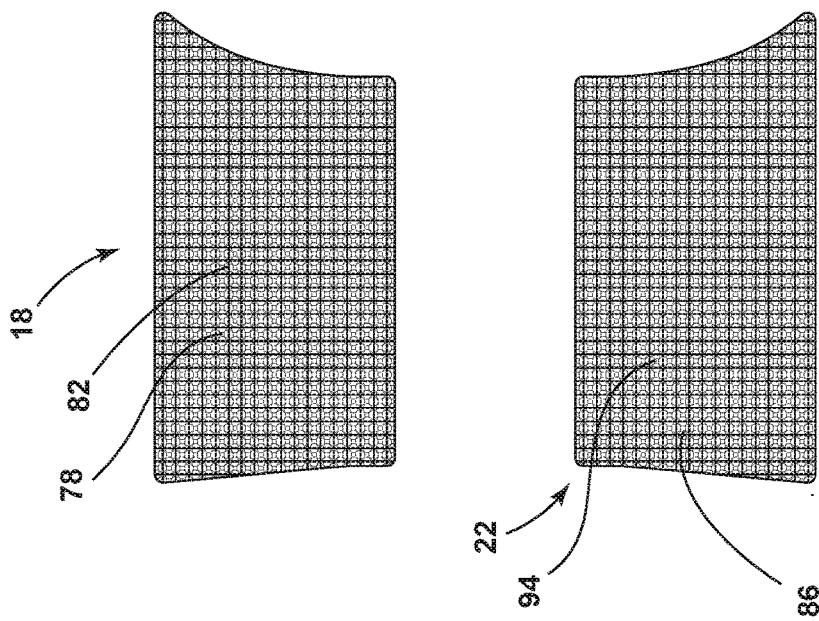

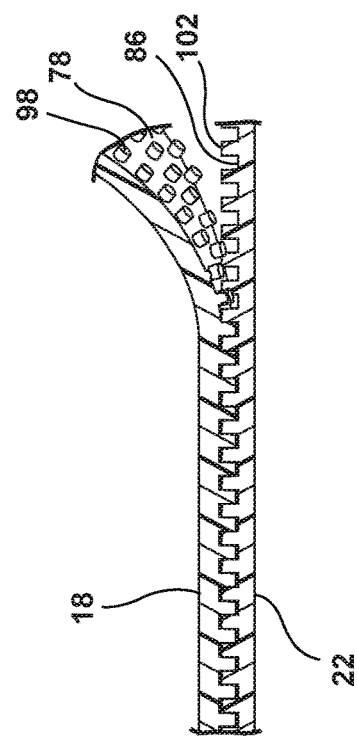
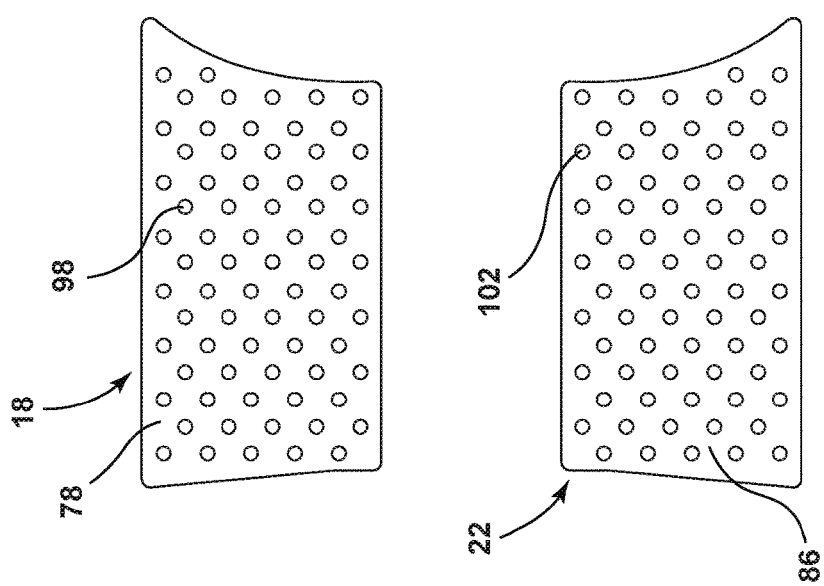

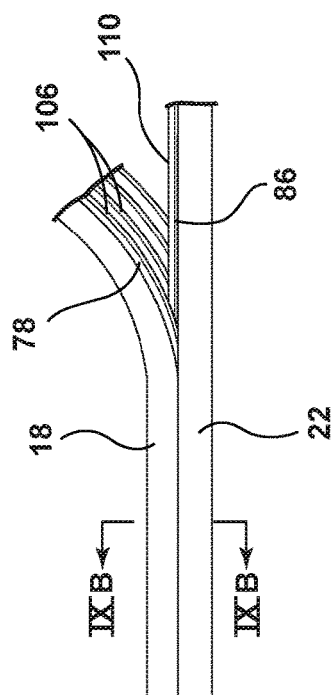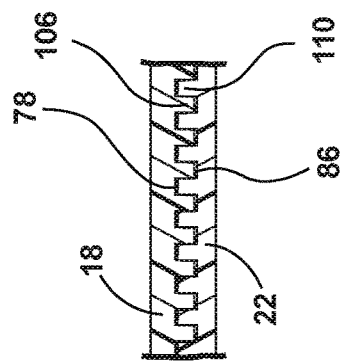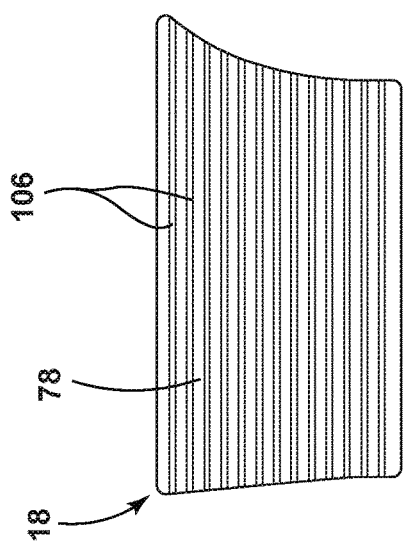
FIG. 9A
FIG. 9B
FIG. 9

US 10,011,238 B2

SPACE FILLER WITH A VACUUM COVER

CROSS-REFERENCE TO RELATED APPLICATION

This application is a divisional of U.S. patent application Ser. No. 15/232,349, filed Aug. 9, 2016, entitled "SPACE FILLER WITH A VACUUM COVER," now U.S. Pat. No. 9,849,845, the entirety of which is incorporated herein by reference.

FIELD OF THE INVENTION

The present invention generally relates to a space filling panel for use in a motor vehicle and, more specifically, to a space filling panel that offers improved noise, vibration, and harshness (NVH) performance.

BACKGROUND OF THE INVENTION

Vehicles often have spaces that are left unfilled that require the usage of space fillers. In addition, these unfilled spaces can contribute to an unwanted increase in noise levels. Many space fillers on the market do not adequately fill the open spaces in a vehicle, and these space fillers can often squeak and break apart when placed under the typical forces experienced in a moving vehicle. The need for a space filler with improved NVH properties and economical production costs are needed in the market.

SUMMARY OF THE INVENTION

According to one aspect of the present invention, an acoustically absorptive space filling panel for a vehicle includes a polystyrene layer, a polyurethane layer, and a polyethylene cover forming a vacuum sealed space. The polystyrene layer and polyurethane layer are positioned in the vacuum sealed space.

According to another aspect of the present invention, a space filling panel for a vehicle includes a polystyrene layer having a plurality of polyurethane chips, and a polyethylene cover forming a vacuum sealed space. The polystyrene layer having the plurality of polyurethane chips is positioned in the vacuum sealed space.

According to another aspect of the present invention, a method for making a space filling panel in a vehicle includes forming a first layer, forming a second layer, contacting a first side of the first layer with a second side of the second layer, and vacuum sealing the first layer and the second layer with a polymeric cover. The space filling panel is disposed in a cabin floor of the vehicle.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 7 is a bottom view of the polystyrene layer having a pyramidal surface geometry and a top view of the polyurethane layer having a pyramidal surface geometry according to one embodiment;

FIG. 7A is a side view of the space filling panel made from the layers in FIG. 7 according to one embodiment;

FIG. 8 is a bottom view of the polystyrene layer having a cylindrical surface geometry and a top view of the polyurethane layer having a cylindrical surface geometry according to one embodiment;

FIG. 8A is a side view of the space filling panel made from the layers in FIG. 8 according to one embodiment;

FIG. 9 is a bottom view of the polystyrene layer having a channeled surface geometry and a top view of the polyurethane layer having a channeled surface geometry according to one embodiment;

FIG. 9A is a side view of the space filling panel made from the layers of FIG. 9 according to one embodiment; and FIG. 9B is a partially schematic fragmentary cross-sectional view of a portion of the space filling panel in FIG. 9A taken along the line IXB-IXB.

DETAILED DESCRIPTION OF THE PREFERRED EMBODIMENTS

Figure 1:
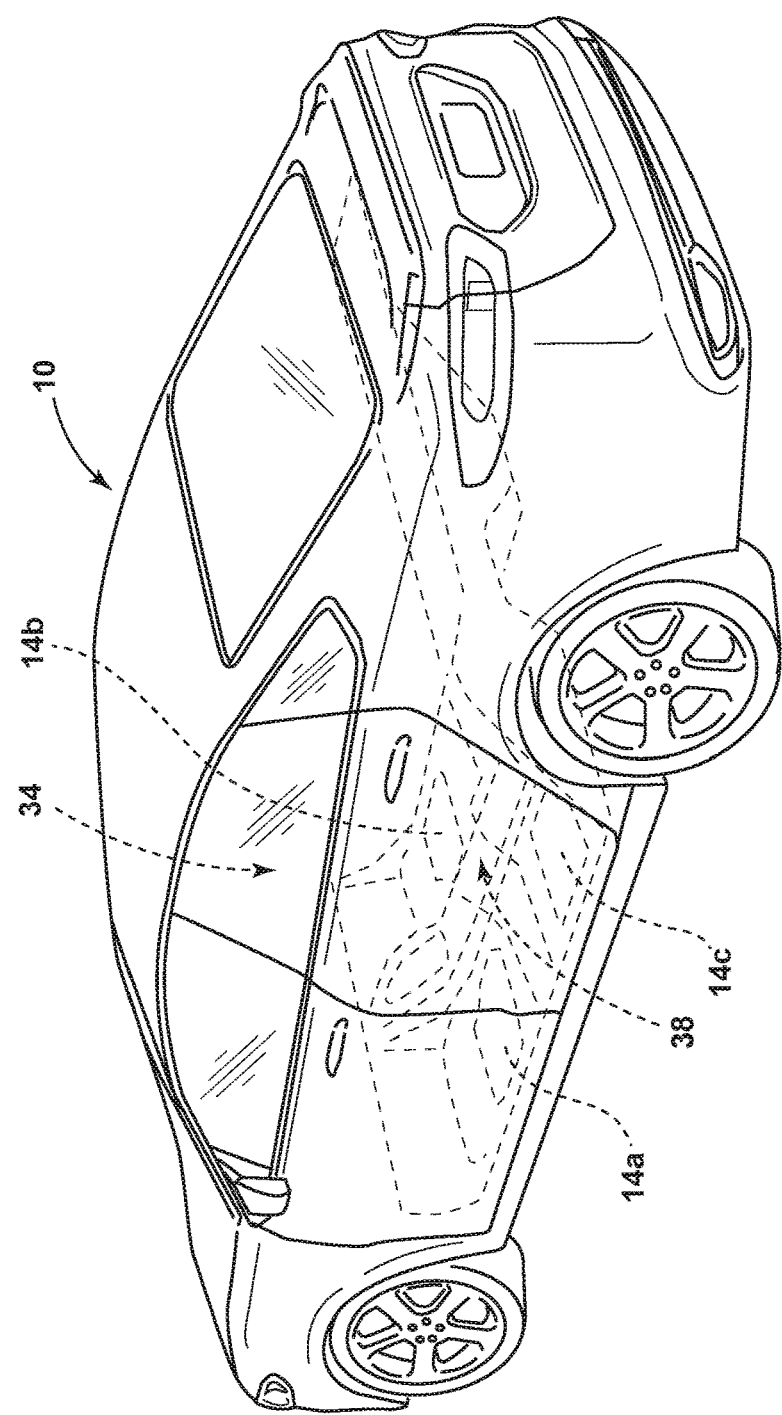
FIG. 1 is an isometric back side perspective view of a vehicle according to one embodiment.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," wherein used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-5, and FIGS. 7-9B, reference numeral 10 generally designates a vehicle, shown as a wheeled motor vehicle, having a space filling panel 14. The space filling panel 14 has a polystyrene layer 18, a polyurethane layer 22, and a polyethylene cover 26 where the polyethylene cover 26 forms a vacuum sealed space 30. The polystyrene layer 18 and the polyurethane layer 22 are both positioned in the polyethylene cover's 26 vacuum sealed space 30.

The space filling panels 14 described herein can be used as a lightweight and affordable option to prevent squeaks and reduce the noise, vibration, and harshness (NVH) experienced by an occupant in the vehicle 10. These space filling panels 14 can be used inside the vehicle 10 in spaces that are left unfilled where the polystyrene layer 18, polyurethane layer 22, and polyethylene cover 26 can be designed to fit in any opening or space. The polymer fillers in the vacuum sealed space 30 of the polyethylene cover 26 can also be used to give structural support to features in the vehicle 10 for both comfort and appearance to the occupant.

Figure 2:
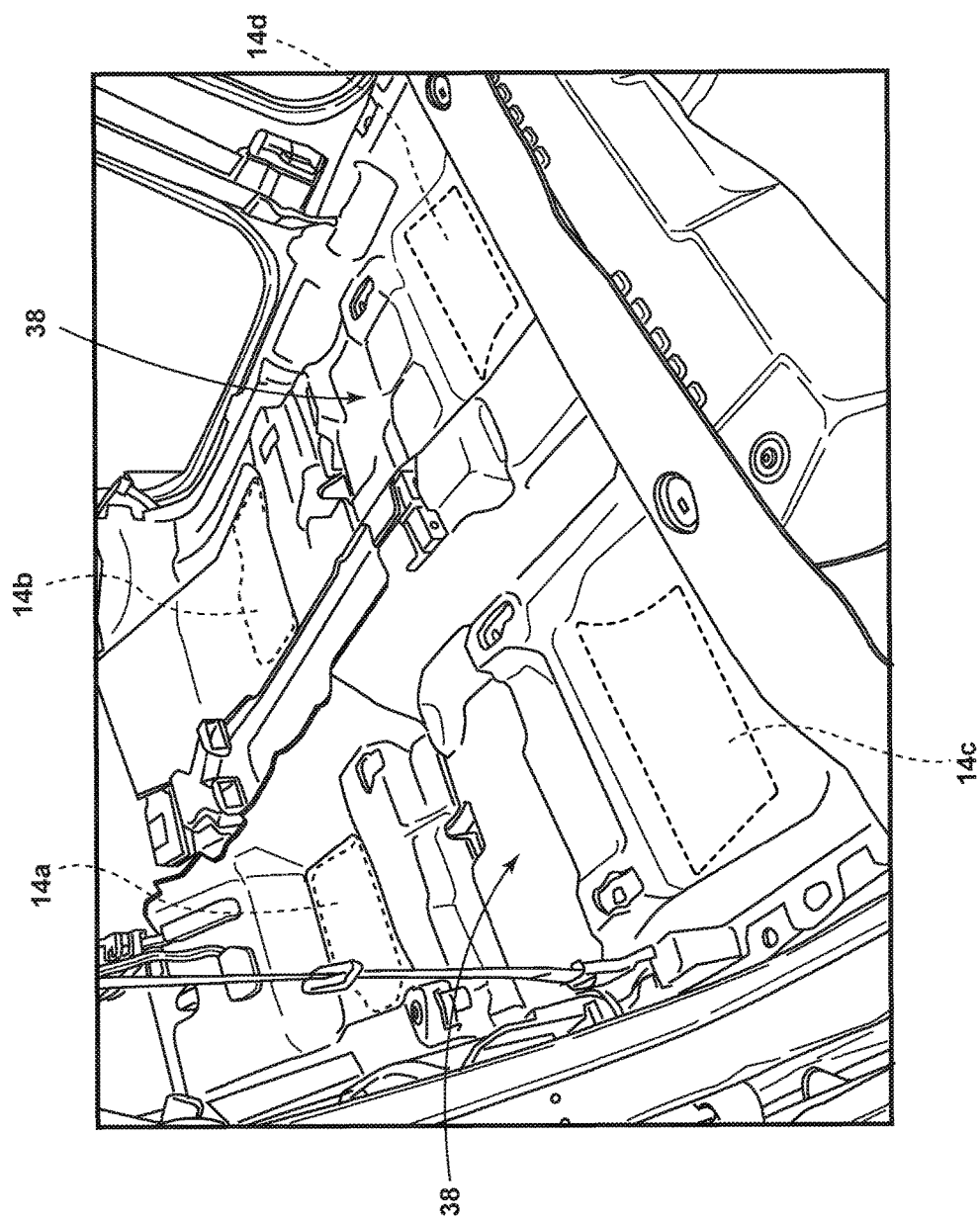
FIG. 2 is a partially schematic cross-sectional view of a main cabin floor of a vehicle according to one embodiment.

Referring now to FIG. 1, the vehicle 10 has a main cabin 34 configured to accommodate one or more passengers and a main cabin floor 38. The main cabin floor 38 may have one or more space filling panels 14. The space filling panel 14 may refer to one or more of the individual space filling panels 14 found in a vehicle such as a front left space filling panel 14a, a front right space filling panel 14b, a back left space filling panel 14c, and a back right space filling panel 14d (FIG. 2). The vehicle 10 may be any type of vehicle known to one skilled in the art. For example, the vehicle 10 may be a car, a truck, a minivan, a commercial vehicle, or any other type of consumer or commercial vehicle.

With reference to FIG. 2, the main cabin floor 38 is shown having the front left space filling panel 14a, the front right space filling panel 14b, the back left space filling panel 14c, and the back right space filling panel 14d provided thereon. However, it should be appreciated that the space filling panel 14 may be located in other areas of the vehicle that may have open voids or spaces to be filled. For example, the space filling panels 14 could be placed in a door, a quarter panel, a trunk, a storage compartment, a hood, a roof, or any other portion of the vehicle 10 where a reduction in NVH is desired and/or a space needs to be filled. The space filling panel 14 may be coupled into position by any number of non-limiting methods or devices such as, for example, attachment members, glue, additional paneling, and/or merely physical placement.

Figure 3:
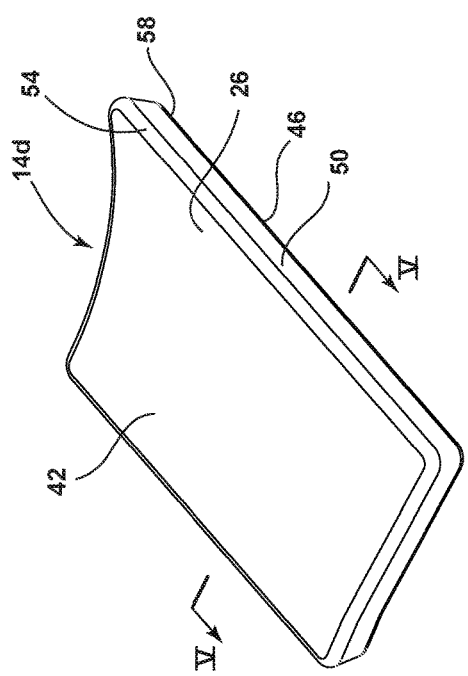
FIG. 3 is an isometric view of a space filling panel according to one embodiment.
Figure 4:
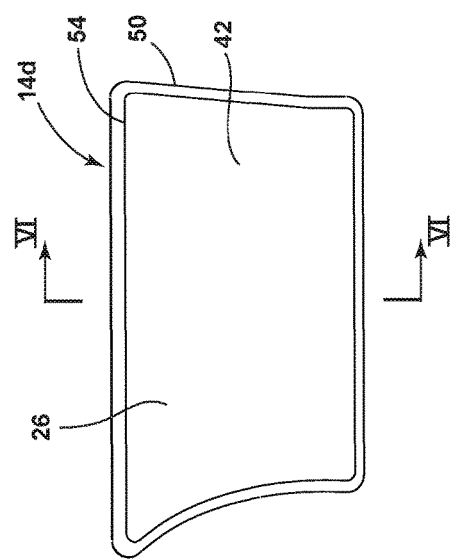
FIG. 4 is a top view of the space filling panel shown in FIG. 3.

Referring now to FIGS. 3-4, the back right space filling panel 14d shown is through an isometric view (FIG. 3) and a top view (FIG. 4). The back right space filling panel 14d has a top side 42, a bottom side 46, a side wall 50, a top edge 54, and a bottom edge 58. The polystyrene layer 18 (FIG. 5) and the polyurethane layer 22 (FIG. 5) are completely encapsulated in the vacuum sealed space 30 (FIG. 5) surrounded by the polyethylene cover 26.

Figure 5:
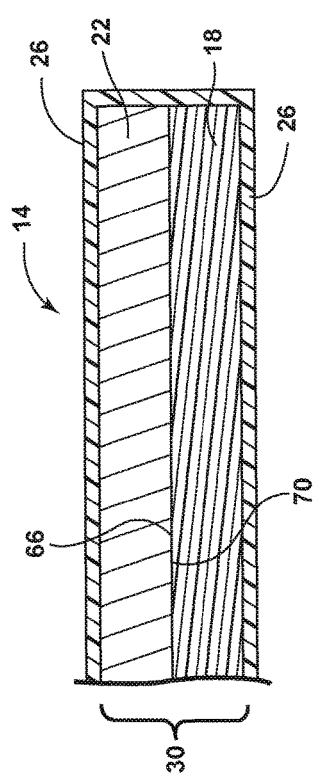
FIGS. 5-5A are partially schematic cross-sectional views of a portion of the space filling panel of FIG. 3 taken along the line V-V.

Referring now to FIG. 5, the polyurethane layer 22 is shown coupled to the polystyrene layer 18 through a polyurethane surface geometry 66 and a polystyrene surface geometry 70. The polystyrene layer 18 and the polyurethane layer 22 are positioned in the vacuum sealed space 30 formed by the polyethylene cover 26. The polyethylene cover 26 completely surrounds the polyurethane layer 22 and the polystyrene layer 18 to keep the layers 18, 22 in place with respect to each other. In the embodiment shown in FIG. 5, there at least four layers shown going from top to bottom: the polyethylene cover 26, the polyurethane layer 22, the polystyrene layer 18, and the polyethylene cover 26. In some embodiments, one or more polyurethane layers 22 may be coupled with one or more polystyrene layers 18 in any combination or number. For example, there may be one polyurethane layer 22 coupled to two polystyrene layers 18, two polyurethane layers 22 coupled to two polystyrene layers 18, two polyurethane layers 22 coupled to three polystyrene layers 18, or three polyurethane layers 22 coupled to four polystyrene layers 18. These same combinations could be made with the polyurethane layers 22 and the polystyrene layers 18 switched. In other embodiments, no adhesive or lubricant is applied or used between the polystyrene layers 18 and polyurethane layers 22. The polyurethane and polystyrene surface geometries 66, 70 can include pyramidal, conical, channeled, or any other geometry capable of interlocking or coupling with itself on opposing surfaces.

Figure 5A:
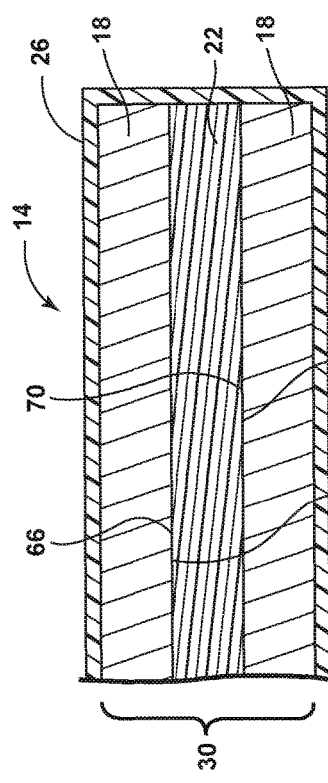

Referring now to FIG. 5A, the polyurethane layer 22 is shown coupled or sandwiched between two polystyrene layers 18 through the polyurethane surface geometry 66 on the top and bottom sides of the polyurethane layer 22 and the corresponding polystyrene surface geometries 70 on the polystyrene layers 18. The polystyrene layers 18 and the polyurethane layer 22 are positioned in the vacuum sealed space 30 formed by the polyethylene cover 26. The polyethylene cover 26 completely surrounds the polyurethane layer 22 and the polystyrene layers 18 to keep the layers 18, 22 in place with respect to each other. In other embodiments, the polystyrene layer 18 may have the polystyrene surface geometry 70 on its top and bottom sides and can be sandwiched between two polyurethane layers 22 and its corresponding polyurethane surface geometry 66 wherein the three layers are then surrounded by the polyethylene cover 26 forming the vacuum sealed space 30. The polyurethane and polystyrene surface geometries 66, 70 can include pyramidal, conical, channeled, or any other geometry capable of interlocking or coupling with itself on opposing surfaces.

The polystyrene layer 18 may be produced from a variety of polystyrene sources including, but not limited to, for example, an expanded polystyrene (EPS), a foam polystyrene, an extruded polystyrene foam, and/or styrene copolymers. In some embodiments, the polystyrene layer 18 is an expanded polystyrene layer and has a density in the range of 1.35 pcf to 1.80 pcf. The thickness of the polystyrene layer 18 used in the space filling panel 14 may have a thickness of at least 8 mm, a thickness of at least 15 mm, a thickness of at least 20 mm, or a thickness of at least 30 mm. The polyurethane layer 22 may be produced from a variety of monomer sources not meant to be limiting, for example, a foam polyurethane, an extruded polyurethane foam, and/or a variety of different glycol urethane copolymers. The thickness of the polyurethane layer 22 used in the space filling panel 14 may have a thickness of at least 8 mm, a thickness of at least 15 mm, a thickness of at least 20 mm, or a thickness of at least 30 mm. The thickness of the polystyrene layer 18 and the polyurethane layer 22 may be the same or different depending on the desired application. In some embodiments, both the polystyrene layer 18 and the polyurethane layer 22 may have a thickness of at least 8 mm. In other embodiments, the polystyrene layer 18 may have a thickness of at least 15 mm and the polyurethane layer 22 have a thickness of at least 8 mm. The polyethylene cover 26 used to create the vacuum sealed spaced 30 to position/ encase the polystyrene layer 18 and the polyurethane layer 22 may have a thickness of less than 15 mm, a thickness of less than 10 mm, a thickness of less than 4 mm, a thickness of less than 2 mm, and a thickness of less than 1 mm.

The vacuum sealed space 30 formed by the polyethylene cover 26 being vacuum sealed around the polystyrene and polyurethane layers 18, 22 can be made with any conventional or commercial vacuum packing machine. In some embodiments, the vacuum of the vacuum sealed space 30 has a pressure less than 1.0 atm, a pressure less than 0.5 atm, a pressure less than 0.1 atm, or a pressure less than 0.01 atm. When forming the vacuum sealed space 30, the pressure exerted on the polystyrene and polyurethane layers 18, 22 preferably should not create more than a 10% compression, should not create more than a 5% compression, or should not create more than a 1% compression relative to the initial pre-compressed volume of the polystyrene and polyurethane layers 18, 22.

Figure 6:
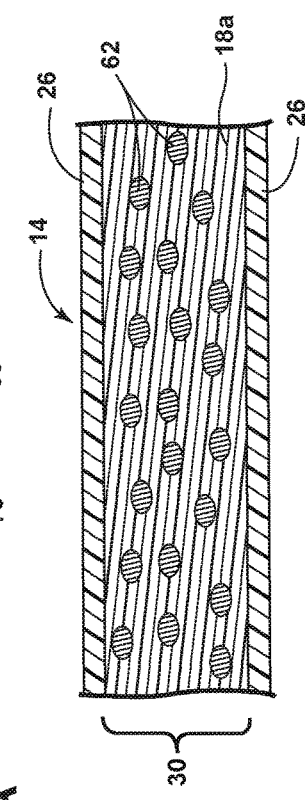
FIG. 6 is a partially schematic fragmentary cross-sectional view of the space filling panel of FIG. 4 taken along the line VI-VI.

Referring now to FIG. 6, the polystyrene layer 18a has a plurality of polyurethane pieces or chips 62 embeddingly coupled in the polystyrene layer 18a. The polystyrene layer 18a has the plurality of polyurethane chips 62 positioned in the vacuum sealed space 30 created by the polyethylene cover 26. The plurality of polyurethane chips 62 may be in any size or shape and may be polydispersed across a variety of different sizes and shapes. The plurality of polyurethane chips 62 may comprise at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, or at least 75 wt % of the space filling panel 14. In some embodiments, the plurality of polyurethane chips 62 makes up at least 25 wt % of the space filling panel. In other embodiments, the plurality of polyurethane chips 62 makes up at least 35 wt % of the space filling panel. The plurality of polyurethane chips 62 may be added to the polystyrene layer 18a by any means known in the art.

Referring now to FIGS. 7-7A, the polystyrene layer 18 having a polystyrene pyramidal surface geometry 82 on a bottom surface 78 and the polyurethane layer 22 having a polyurethane pyramidal surface geometry 94 on a top surface 86 is shown. The polystyrene pyramidal surface geometry 82 and the polyurethane pyramidal surface geometry 94 are complementary to each other in that the pyramidal surface geometries 82, 94 interconnect the polystyrene layer 18 and the polyurethane layer 22 so that they do not slide or move laterally with respect to each other. The polystyrene pyramidal surface geometry 82 fits into the gaps of the polyurethane pyramidal surface geometry 94 so there is a close coupling between the bottom surface 78 of the polystyrene layer 18 and the top surface 86 of the polyurethane layer 22. FIG. 7A shows a side view of the interconnection or coupling of the pyramidal surface geometries 82, 94 like a zipper between the bottom surface 78 and the top surface 86. In some embodiments, a polystyrene top surface 74 and a polyurethane bottom surface 90 may have additional surface geometries depending on the application and the need for additional layers. In some embodiments, the polyurethane layer 22 and the polystyrene layer 18 each have at least one surface with the pyramidal surface geometries 82, 94 that interlockedly couple the polyurethane layer 22 to the polystyrene layer 18. In other embodiments, the polyurethane layer 22 and the polystyrene layer 18 each have their top and bottom surfaces 86, 78 with the pyramidal surface geometries 82, 94 that interlockedly couple the polyurethane layer 22 to the polystyrene layer 18.

Referring now to FIGS. 8-8A, the polystyrene layer 18 having a polystyrene cylindrical surface geometry 98 on the bottom side 78 of the polystyrene layer 18 and the polyurethane layer 22 having the polyurethane cylindrical surface geometry 102 on the top side 86 of the polyurethane layer 22 is shown. The polystyrene cylindrical surface geometry 98 and the polyurethane cylindrical surface geometry 102 are complementary to each other in that the cylindrical surface geometries 98, 102 interconnect the polystyrene layer 18 with the polyurethane layer 22 so that they do not slide or move laterally with respect to each other. The polystyrene cylindrical surface geometry 98 fits into the gaps of the polyurethane cylindrical surface geometry 102 so there is a close coupling between the bottom side 78 of the polystyrene layer 18 and the top side 86 of the polyurethane layer 22. FIG. 8A shows a side view of the interconnection or interlocking of the cylindrical surface geometries 98, 102 like a zipper between the bottom side 78 and the top side 86. In some embodiments, the polyurethane layer 22 and the polystyrene layer 18 each have at least one surface with the cylindrical surface geometries 98, 102 that interlockedly couple the polyurethane layer 22 to the polystyrene layer 18. In other embodiments, the polyurethane layer 22 and the polystyrene layer 18 each have their top and bottom surfaces 86, 78 with the cylindrical surface geometries 98, 102 that interlockedly couple the polyurethane layer 22 to the polystyrene layer 18.

Referring now to FIGS. 9-9B, the polystyrene layer 18 having a polystyrene channeled surface geometry 106 on the bottom side 78 of the polystyrene layer 18 and the polyurethane layer 22 having the polyurethane channeled surface geometry 110 on the top side 86 of the polyurethane layer 22 is shown. The polystyrene channeled surface geometry 106 and the polyurethane channeled surface geometry 110 are complementary to each other in that the channeled surface geometries 106, 110 interconnect the polystyrene layer 18 with the polyurethane layer 22 so that they do not slide or move laterally with respect to each other. The polystyrene channeled surface geometry 106 fits into the gaps of the polyurethane channeled surface geometry 110 so there is a close coupling between the bottom side 78 of the polystyrene layer 18 and the top side 86 of the polyurethane layer 22. FIG. 9B shows a side view of the interconnection or interlocking of the channeled surface geometries 106, 110 like a zipper between the bottom side 78 and the top side 86. In some embodiments, the polyurethane layer 22 and the polystyrene layer 18 each have at least one surface with the channeled surface geometries 106, 110 that interlockedly couple the polyurethane layer 22 to the polystyrene layer 18. In other embodiments, the polyurethane layer 22 and the polystyrene layer 18 each have their top and bottom surfaces 86, 78 with the channeled surface geometries 106, 110 that interlockedly couple the polyurethane layer 22 to the polystyrene layer 18.

A method for making the space filling panel 14 in the vehicle 10 includes forming a first layer, forming a second layer, contacting a first side of the first layer with a second side of the second layer, and vacuum sealing the first layer and the second layer with a polymeric cover. The space filling panel is disposed in a cabin floor of the vehicle. The first layer and second layers may be any polymer material, for example, the polystyrene and polyurethane layers 18, 22 described herein. The vacuum sealing can be formed with any gas impermeable polymeric material, e.g. polyethylene, to form the vacuum sealed space 30 as described herein. The first and second sides may additionally have surface geometries 66, 70 as described by the description herein. This method for making the space filling panel 14 can be combined with any one or more of the intervening features described herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A space filling panel for a vehicle comprising:
   a polystyrene layer comprising a plurality of polyurethane chips; and
   a polyethylene cover forming a vacuum sealed space;
   wherein the polystyrene layer comprising the plurality of polyurethane chips is positioned in the vacuum sealed space.

2. The space filling panel of claim 1, wherein the polystyrene layer is an expanded polystyrene layer.

3. The space filling panel of claim 1, wherein the plurality of polyurethane chips are embeddingly coupled in the polystyrene layer.

4. The space filling panel of claim 1, wherein the plurality of polyurethane chips comprise at least 25 wt % of the space filling panel.

5. The space filling panel of claim 1, wherein the plurality of polyurethane chips comprise at least 35 wt % of the space filling panel.

6. The space filling panel of claim 1, wherein the vacuum sealed space has a pressure less than 1 atm.

7. The space filling panel of claim 1, wherein the vacuum sealed space has a pressure less than 0.5 atm.

8. The space filling panel of claim 1, wherein the polystyrene layer improves the space filling panel's NVH properties.

9. A method for making a space filling panel in a vehicle comprising:
   forming a first layer having a plurality of polymer chips disposed within the first layer; and
   vacuum sealing the first layer with a polymeric cover to form the space filling panel;
   wherein the space filling panel is disposed in a cabin floor of the vehicle.

10. The method of claim 9, wherein the polystyrene is an expanded polystyrene layer.

11. The method of claim 9, wherein the plurality of polymer chips comprise at least 25 wt % of the space filling panel.

12. The method of claim 9, wherein the plurality of polymer chips comprise at least 35 wt % of the space filling panel.

13. The method of claim 9, wherein the space filling panel has a pressure less than 1 atm.

14. The method of claim 9, wherein the space filling panel has a pressure less than 0.5 atm.

15. The method of claim 9, wherein the first layer having the plurality of polymer chips improves the space filling panel's NVH properties.

* * * * *